United States Patent [19]
Gilley et al.

[11] Patent Number: 5,544,291
[45] Date of Patent: Aug. 6, 1996

[54] RESOLUTION-INDEPENDENT METHOD FOR DISPLAYING A THREE DIMENSIONAL MODEL IN TWO-DIMENSIONAL DISPLAY SPACE

[75] Inventors: Glenn G. Gilley, Mountain View, Calif.; Brice W. Tebbs, Chapel Hill, N.C.

[73] Assignee: Adobe Systems, Inc., Mountain View, Calif.

[21] Appl. No.: 150,370

[22] Filed: Nov. 10, 1993

[51] Int. Cl.$^6$ ................................................. G06T 15/00
[52] U.S. Cl. .......................... 395/123; 395/128; 395/129; 395/126
[58] Field of Search ................................. 382/25, 26, 10, 382/21, 22, 181, 196, 197, 203, 204; 395/129130, 131, 134, 118–119, 125–126, 127, 130–131, 128–129, 133, 31, 123, 128–9

[56] References Cited

U.S. PATENT DOCUMENTS

| | | | |
|---|---|---|---|
| 4,600,919 | 7/1986 | Stern | 340/725 |
| 5,063,375 | 11/1991 | Lien et al. | 340/703 |
| 5,097,427 | 3/1992 | Lathrop et al. | 395/130 |
| 5,159,512 | 10/1992 | Evans et al. | 395/119 |
| 5,179,638 | 1/1993 | Dawson et al. | 395/125 |
| 5,179,659 | 1/1993 | Lien et al. | 395/164 |
| 5,278,948 | 1/1994 | Luken, Jr. | 395/123 |
| 5,317,682 | 5/1994 | Luken, Jr. | 395/142 |
| 5,369,736 | 11/1994 | Kato et al. | 395/125 |
| 5,379,370 | 1/1995 | Allain et al. | 395/122 |
| 5,388,059 | 2/1995 | DeMenthon | 364/559 |
| 5,388,990 | 2/1995 | Beckman | 434/38 |

OTHER PUBLICATIONS

Foley et al, *Computer Graphics, Principles & Practices*, Addison–Wesley Pub. Co., (1990).
Sinha, et al., "Verifying the 'Consistency' of Shading Patterns and 3–D Structures", Qualitative Vision Conference (Jun. 1993).
Choe, et al. "3–D Shape From a Shaded and Textural Surface Image", IEEE Transactions on Pattern Ana. & Moch. Intl. (1991).
Heckbert, Paul S., "Survey of Texture Mapping," Computer Graphics and Applications, pp. 56–67 (1986).
"Rendering Cubic Curves and Surfaces with Integer Adaptive Forward Differencing", Sheue–Ling Chang, Michael Shantz and Robert Rocchetti (Sun Microsystems), Computer Graphics, vol. 23, No. 3, Jul. 1989.
"Hidden Curve Removal for Free Form surfaces", Gershon Elber and Elaine Cohen, Computer Graphics, vol. 24, No. 4, Aug. 1990.
"Adaptive Forward Differencing for Rendering Curves and Surfaces", Sheue–Ling Lien, Michael Shantz and Vaughan Pratt (Sun Microsystems), Computer Graphics, vol. 21, No. 4, Jul. 1987.
"A Solution to the Hidden Surface Problem", M. E. Newell, R. G. Newell and t. L. Sancha, The Computer–Aided design Center, Proceedings of the ACM Annual Conference, Aug. 1972.

*Primary Examiner*—Mark K. Zimmerman
*Assistant Examiner*—Rudolph J. Buchel

[57] ABSTRACT

A method for rendering a graphics image of a three-dimensional graphics model is described. The method consists of the steps of projecting a parametric surface representation of the three-dimensional graphics model into a two-dimensional parametric space; mapping an array of grid points onto the parametric space; evaluating a shading function at each grid point to form an array shading values; applying a contouring function to the array of shading values to determine boundary curves for regions of constant shading; applying a silhouette function to the parametric surface representation of the three-dimensional graphics model to determine the boundaries for regions of consistent-facing; clipping the regions of constant shading by the regions of consistent-facing to determine consistent-facing regions of constant color; mapping the regions of constant shading back to the surface of the three-dimensional model; occluding hidden surfaces; mapping the clipped regions of constant shading to display space; and filling the regions of constant shading in display space. The regions of constant shading are available for editing by a two-dimensional drawing package.

11 Claims, 4 Drawing Sheets

RESOLUTION-INDEPENDENT METHOD FOR DISPLAYING A THREE DIMENSIONAL MODEL IN TWO-DIMENSIONAL DISPLAY SPACE

FIELD OF THE INVENTION

This invention relates to computer graphics and, more particularly, to a method for preparing a three-dimensional image for editing in two-dimensions and for display.

BACKGROUND OF THE INVENTION

Computer graphics technology creates images from digital data-bases composed of mathematically-described models. Models may be defined in two dimensions or in three dimensions. A graphics system creates an image of a three-dimensional model to appear as it would if the model were real and viewed from a particular point in space. Such techniques have found broad utility in creating images for science, entertainment and advertising; for interactive computer aided design; and for many other applications.

The final two-dimensional image is ultimately displayed, for example, on a raster device such as a computer screen, laser printer or typographic device. The image is composed of an array of picture elements (pixels), which are the smallest units or "dots" on a raster display for which a color or gray shade may be set. The quality of the image depends upon the size and number of pixels. Larger quantities of smaller pixels yield higher resolution images.

Rendering entails calculating the color values or grayscale shade for each pixel to generate the desired image. The color or grayscale shade of each pixel depends, in turn, upon the lighting of the model, surface geometry, surface properties (i.e., the way a surface is assumed to reflect or absorb light) and the eyepoint position.

Traditional methods of rendering are described by Foley, et al., *Computer Graphics: Principles and Practice*, 2nd ed., Addison Wesley Publishing Company, 1990, ISBN 0-201-12110-7. The subject of calculation of lighting effects on surfaces is covered in detail by Roy Hall, *Illumination and Color in Computer Generated Imagery*, Springer-Verlag, 1988, ISBN 0-387-96774-5 which is herein incorporated by reference.

In what is called resolution-dependent rendering, models are converted to raster images in a continuous process that produces an image of a predetermined resolution based on the resolution of the output device. For resolution-independent rendering, an intermediate description of the model is first produced. This intermediate description is independent of the resolution of the output device and can be edited at one resolution and printed or otherwise output at another, typically much higher, resolution.

Traditional three-dimensional rendering methods are polygon-based. That is, models that are not directly formed of polygons are converted into polygons for rendering. Thus, for example, each curved surface is converted into an approximation of the surface made of small polygonal facets, usually triangles.

Traditional three-dimensional rendering methods are also resolution-dependent. Thus, the resolution of the output image is determined before the image is generated, and once generated the resolution generally cannot be increased even when displayed on a higher resolution device. Pixels in a rendered image may be replicated or interpolated to increase the total number of pixels, but extra pixels added by replication or interpolation do not increase the sharpness of the image. Therefore, the resolution of the image is not increased (even though its appearance can be made more pleasing to the eye) when displayed on a higher resolution device.

Resolution-dependent rendering methods have a number of disadvantages. One disadvantage is that producing a high resolution end-product image requires relatively large amounts of computer storage and processing. For example, high quality printing may require 2400 pixels per inch or more. At 2400 pixels per inch, an 8×10 inch image has over 460 million pixels, with one or more bytes of storage required for each pixel. That amount of storage is expensive and the processing to obtain it inconveniently slow.

Another disadvantage of resolution-dependent imagery is that the flexibility of editing is limited. For example, if a rendered model is moved slightly within the image by editing the pixels of the rendered version of the model, the uncovered portion of the image cannot be regenerated quickly because, in practice, the whole image is usually regenerated from scratch with the model moved in the database. The inefficiency of editing resolution-dependent images often forces the user to settle for lower resolution outputs than a particular output device is capable of generating because obtaining a higher resolution output would be too slow.

Unlike three-dimensional graphics rendering, two-dimensional rendering has been widely available in forms that work directly with curves and in forms that are resolution-independent. For example, products like Adobe Illustrator permit drawings to be made and edited in a resolution-independent format. This is helpful for the preparation of illustrations which are originated and edited on comparatively low-resolution (typically 72 pixels per inch) computer screens, but ultimately output on laser printers (300 to 600 pixels per inch) or typographic equipment (typically 1200 to 2400 pixels) per inch. The ability to edit in a lower resolution version saves equipment costs and computation time.

Another problem with resolution-dependent three-dimensional model renderings is the difficulty of combining those rendered images with resolution-independent, two-dimensional illustrations. Illustrators would benefit from combining both three-dimensional models and two-dimensional models in a resolution-independent format, and from being able to edit the combined illustration with a single tool set. For example, an illustration of a bottle with a label could be done by drawing the label in two-dimensions, rendering the bottle in three-dimensions, curving the label in three-dimensions to conform to the bottle shape, and positioning the label, bottle and perhaps other elements in a two-dimensional layout for printing. This type of application is difficult without a resolution-independent three-dimensional rendering method.

Resolution-independent rendering is more challenging for curved surfaces than for polygons. Moreover, surfaces having only one direction of curvature, such as a cylinder, are easier to render than surfaces having compound curvature, such as a bottleneck. Compound curves commonly have been rendered by first converting the modeled surface to an approximation made by triangles, which is time consuming and limited in accuracy. Work also has been done with direct resolution-dependent rendering of compound curves, for example, that of S. Chang, et al., "Rendering Cubic Curves and Surfaces with Integer Adaptive Forward Differencing," *Computer Graphics*, Vol. 23, No. 3, July 1989.

Objects of this invention are: (1) to provide a method for three-dimensional rendering that provides a resolution-independent, two-dimensional output; (2) to provide an improved method for three-dimensional rendering that will work with curved surfaces, including compound curved surfaces, without approximating these surfaces by triangles; and (3) to provide a three-dimensional rendering method that is compatible with existing two-dimensional computer illustration programs and with existing printing equipment so that adding three-dimensional models to illustrations is facilitated.

SUMMARY OF THE INVENTION

A method for rendering a graphics image of a three-dimensional graphics model is described. The method comprises the steps of projecting a parametric surface representation of the three-dimensional graphics model into a two-dimensional parametric space; mapping an array of grid points onto the parametric space; evaluating a shading function at each grid point to form an array of shading values; applying a contouring function to the array of shading values to determine boundary curves for regions of constant shading; applying a silhouette function to the parametric surface representation of the three-dimensional graphics model to determine the boundaries for regions of consistent-facing; clipping the regions of constant shading by the consistent-facing regions to determine consistent-facing regions of constant color; mapping the regions of constant shading back to the three-dimensional surface of the original model; occluding the hidden surfaces; projecting the model into display space; and filling the regions of constant shading in display space. The regions of constant shading are available for editing by a two-dimensional drawing package.

DETAILED DESCRIPTION OF THE INVENTION

Terminology

Figure 1:
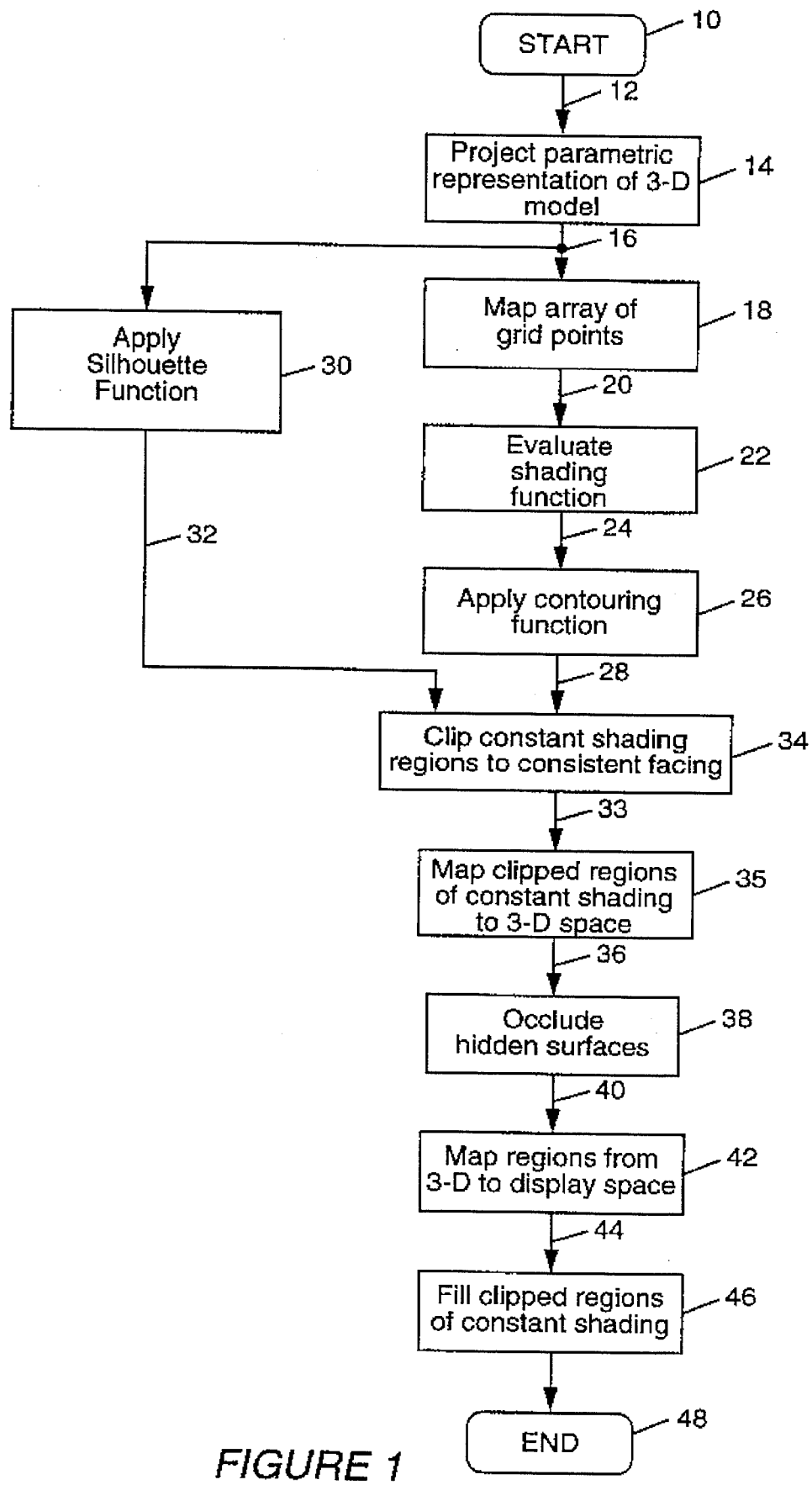
FIG. 1 is a process flow chart of the method of the invention.

A primitive is a mathematically defined portion of a model. For the method of the present invention, primitives are bicubic patch meshes, a set of which defines the model.

A bicubic patch is well-known in the art and consists of a polynomial representation of a surface within bounds. The bounds of a patch are formed by curves. The curves are usually defined to correspond to straight lines in parametric space.

A bicubic patch mesh is a group of adjoining bicubic patches where at least the first derivatives are continuous across any two adjoining patches in the mesh. Continuity of the derivatives means, generally, that the individual bicubic patches are joined smoothly into a mesh without apparent edges or "seams." In general, a bicubic patch mesh represents a curved surface, with a polygon being a special case of a bicubic patch. Primitives are joined (without constraints on continuity of derivatives) to form a model.

A mapping is a correspondence between two spaces such that each point in one space corresponds to a point in the other space. An example is the mapping of points on the surface of the earth to the points on a flat map of the earth established by, say, a Mercator projection.

A parametric space is a two-dimensional coordinate space having axes corresponding to two parameters defined on a two- or three-dimensional surface. A parametric space is, therefore, a uniform coordinate system mapping of points from a surface. Usually a three-dimensional surface is mapped to parameter space.

A parametric surface representation is a mathematical description of a surface where the points of the surface are defined by a mapping from a parameter space.

A shading function is a mathematical function in which a color or gray shade is defined for each point on the surface of a three-dimensional model. The shading function typically depends upon the local orientation of the surface with respect to one or more pre-defined light sources, viewpoint and surface properties.

A contouring function is a process by which curves of constant function value are estimated from an array of function values. For example, a contouring function is used to determine curves of constant elevation from an array of terrain elevation measurements.

The forward facing surfaces of a model are the exterior surfaces facing the viewpoint, so that they are viewable unless occluded.

The backward facing surfaces of a model are the exterior surfaces which face away from the viewpoint and which also represent interior surfaces of a model which face the viewpoint. These interior surfaces are often occluded, but may be visible if the surface has an opening. For example, a cylinder having open ends will have its interior visible from some viewpoints.

Regions of consistent-facing are, collectively, the forward facing and backward facing regions.

A silhouette function is a method for determining the silhouette curve of a model.

A silhouette curve is a curve on the surface of the model separating the forward facing surface from the backward facing surface.

A region of constant shading is a portion of a model surface over which color and intensity values, including all computed lighting effects, is within a predetermined tolerance from a constant value.

Clipping is the process of defining new boundaries for a surface with respect to a defined area called a clip region, such that portions of the surface outside the clip region are excluded. For example, most graphics models are clipped to the rectangular display area, excluding the portions that will not be displayed.

A clip region is a region of any shape defined by clipping.

Perspective projection is the process of converting models mathematically defined in a three-dimensional coordinate system to two-dimensional mathematical models corresponding to an image as viewed in perspective from a particular viewpoint.

A non-perspective projection or orthographic projection is one in which the projected size does not decrease with distance.

Figure 2:
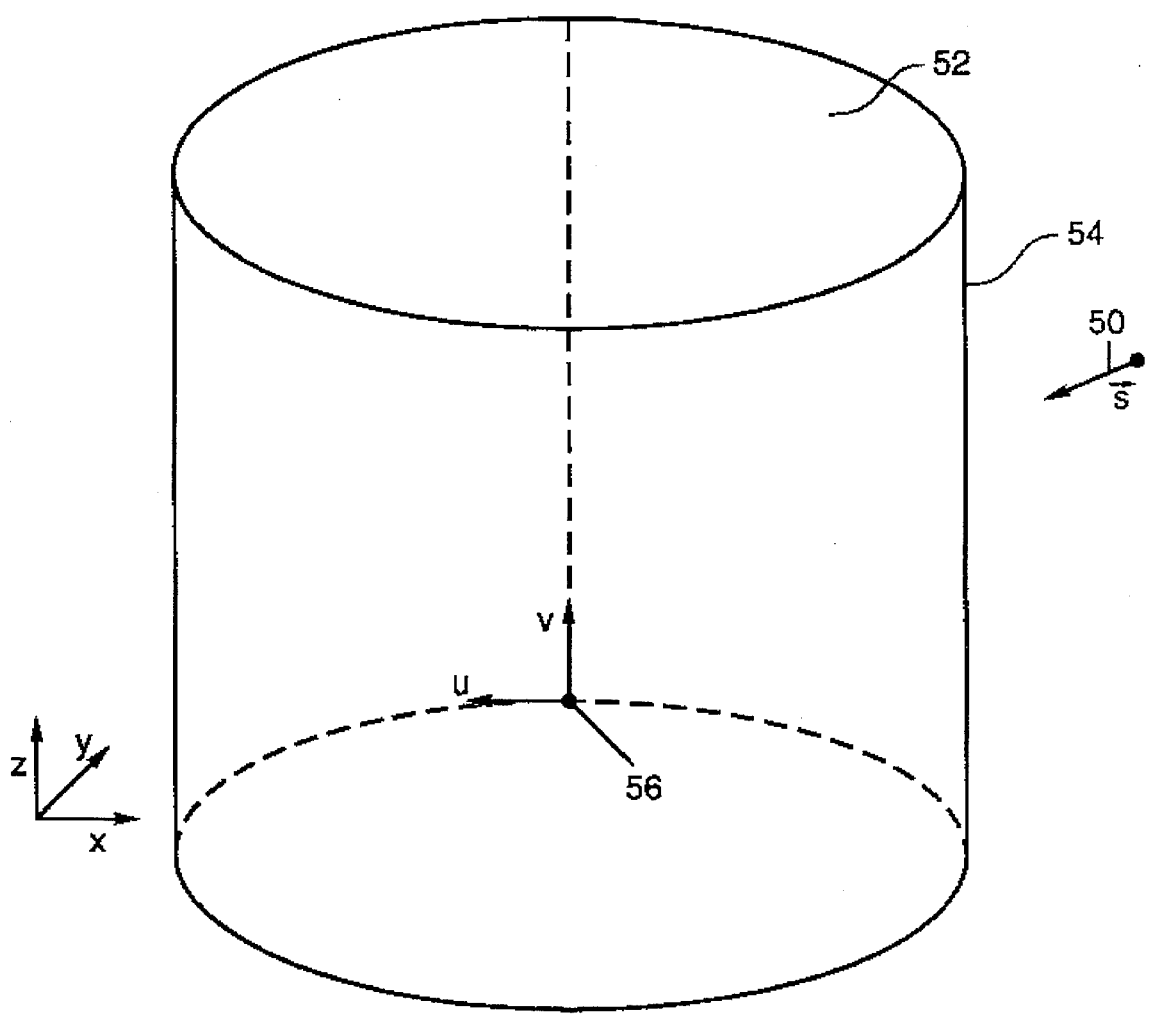
FIG. 2 is a perspective view of a simple cylinder with a parametric space (u,v) defined on the curved surface.

With reference to FIGS. 1 and 2, a rendering method of the invention is described.

The method starts at 10 with a three-dimensional graphical model supplied as input 12 to first step 14 which projects a parametric representation of a 3-D model. FIG. 2 shows a cylinder 52 as an example of a model defined in a three-dimensional coordinate system [x,y,z]. A parametric representation of the curved portion of the cylinder is derived relative to a rectangular two-dimensional coordinate system with axes u 58 and v 60 and with origin 56 at the lower edge of the back of cylinder 52. The projection of the cylinder model curved surface into parameter space forms a rectangle, as shown in FIG. 3, formed analogously to unwinding the surface of the cylinder into a plane (like flattening a paper label removed from a can).

Models are composed of primitives, each of which is readily cast into parametric representation by methods well known in the art. Patches are given implicit parametric representations. For patches in a patch mesh, each patch is assigned an origin according to its position in the mesh. General polygons, which are planar but which may contain holes bounded by curves, are defined in a parameter space defined by an origin point and two vectors, with the magnitude of the vectors providing the scale of the parameter space. Rectangular polygons are assigned a parameter space having axes aligned with the edges of the rectangle. The set of parametric representations of the primitives of the model is the parametric representation of the object.

Still referring to FIG. 1, the parametric representation output 16 from the projection step 14 is input to two independent processing functions: the application of the silhouette function to determine the silhouette in step 30, and the determination of the regions of constant shading in steps 18, 22 and 26. These two independent functions may be performed concurrently or sequentially with either one first.

The application of the silhouette function 30 determines the consistent-facing portions of the model as it is represented in parameter space. A number of methods for determining a silhouette are known in the art. The preferred method is a modification of that published by Gershan Elber and Elaine Cohen in *Computer Graphics*, vol. 24, no. 4, Association for Computing Machinery, August, 1990, which is herein incorporated by reference.

In this modification, silhouette curves are traced across the individual primitives and are combined with the silhouette curves of neighboring primitives to form silhouette curves for the entire model. For each primitive, generally a bicubic patch, a polynomial is generated. That polynomial, which may be called a silhouette function, is generated by computing derivative polynomials in the u and v directions, taking the cross product of these derivative polynomials and dotting the resulting polynomial with the eye vector. The eye vector is a vector from the viewing position to the point where the normal is computed. In the case of an orthographic projection, the eyepoint is at infinity and the eye vector is constant, which reduces the degree of the resulting polynomial. The roots of the polynomial are then found for each of the patch edges.

Because silhouettes are closed curves, if a silhouette enters a patch it must also leave the patch. Roots of the edge polynomial correspond to points where the silhouette curve intersect the patch edge, i.e., where the silhouette curve enters or leaves a patch. There will always be zero or an even number of roots, corresponding to an entry and exit point for each segment of the silhouette curve. A silhouette curve may, in theory, be entirely within a patch, a condition which can be detected and used as a cause for further subdivision. A preferred alternative is to control the original generation of patches so that boundaries pass through maxima and minima of the values of the silhouette function, thereby avoiding isolated contours.

If the roots indicate that more than two intersections occur for any edge, the patch along the edge with the greatest number of intersections is recursively divided until each of the subdivided patches has no more than two intersections. Then, each patch having two intersections has a silhouette curve which is traced between the two intersections. The silhouette curve is traced by stepping the parametric coordinate of the silhouette curve which has the greatest difference between the two end points. For each step of the selected parametric coordinate, the equation of the silhouette curve is solved to find a point along the silhouette curve. These step increments yield a series of points which define a piecewise linear representation of the silhouette curve.

If one edge of the patch is degenerate, i.e., all the control points have the same value, it is treated as a single edge. If the patch is constant in one of the parametric coordinates, the silhouette curve is a straight line in the parameter space connecting the two edge intersections.

Continuing with reference to FIG. 1, the output 32 of the silhouette application function 30 is a piecewise linear representation of a curve in parameter space describing the boundaries of the consistent-facing portions of the model. In the cylinder example shown in FIG. 3(d), the front facing portion of the curved surface is a rectangular subregion 94. All regions of constant shading are rectangular for the cylinder in this example.

Separately, the parametric representation of the model output from step 14 is used to determine the regions of constant shading. A preferred method for determining the regions of constant shading is to first (in step 18) map an array of grid points onto the parametric representation of the model. The spacing of the grid points may be determined from a parameter specified interactively by the user.

Figure 3A:
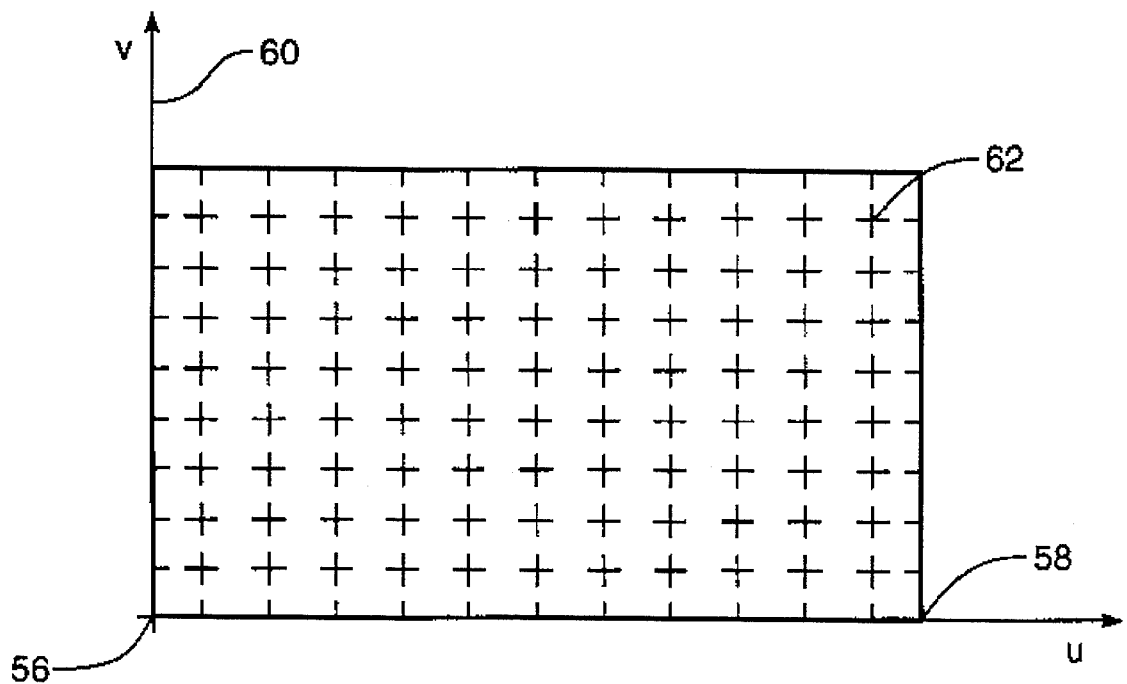
FIG. 3(a) is a representation of the parametric space of the curved surface of a cylinder with grid points.
Figure 3B:
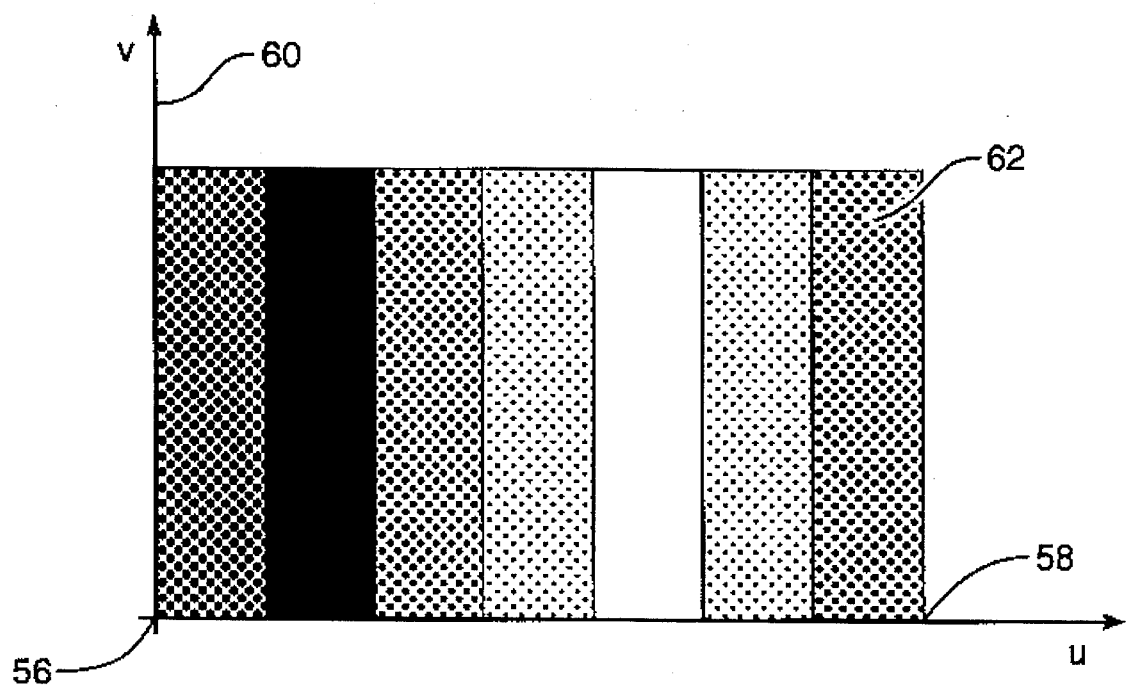
FIG. 3(b) is a representation of the parametric space of the curved surface of a cylinder with shading function.
Figure 3C:
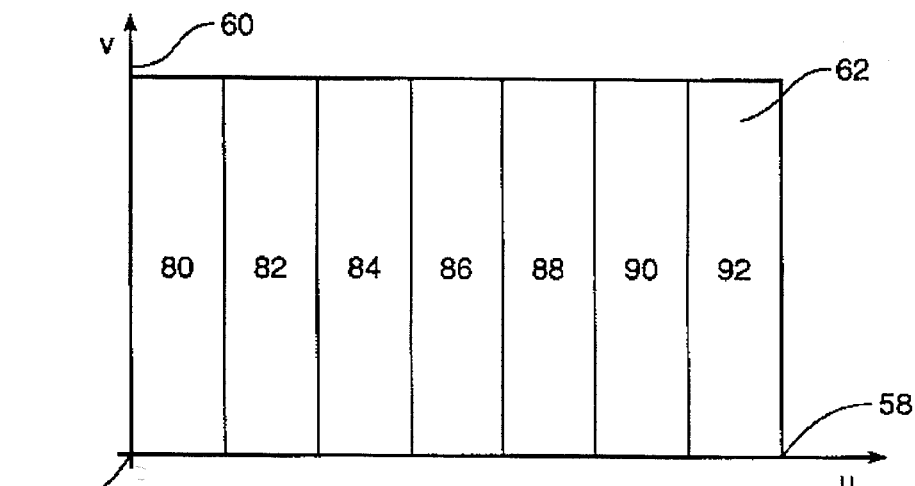
FIG. 3(c) is a representation of the parametric space of the curved surface of a cylinder with regions of constant shading.
Figure 3D:
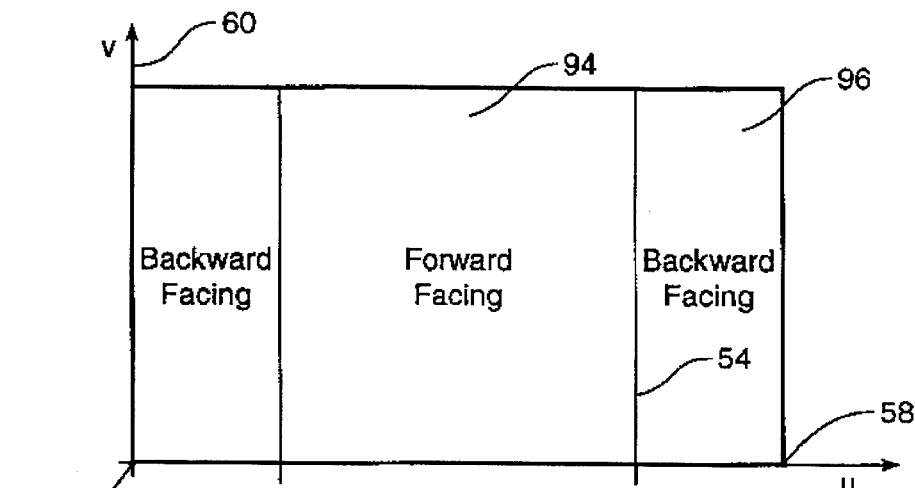
FIG. 3(d) is a representation of the parametric space of the curved surface of a cylinder with silhouette function.
Figure 3E:
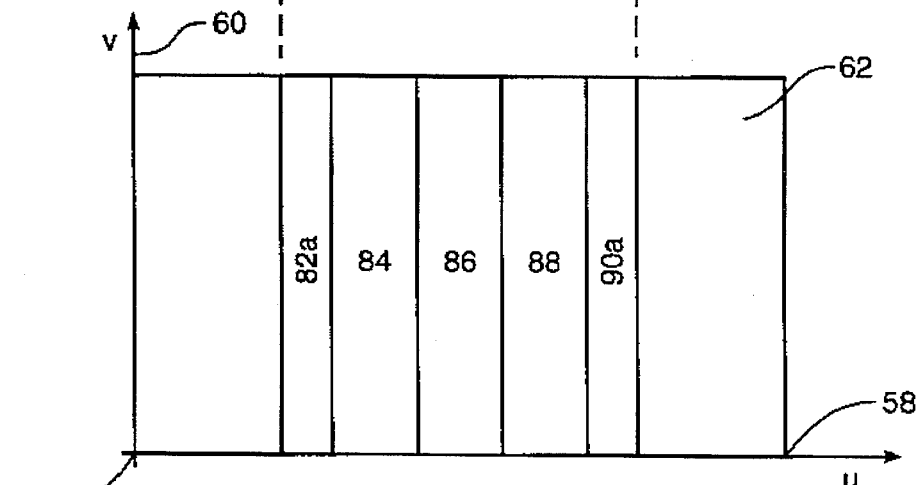
FIG. 3(e) is a representation of the parametric space of the curved surface of a cylinder with regions of constant shading clipped to the silhouette.

The output from step 18, which is an array of grid points, forms input 20 to a shading function evaluation step 22. The shading function determines the color or gray scale shade of the surface at each grid point, and provides an array of shading values output at 24. For cylinder 52 shown in FIG. 2, each grid point 62 shown in FIG. 3(a) is applied to the shading function shown in FIG. 3(b). A preferred shading function is:

$$v = (\underline{S} \, \underline{N} + d)r$$

where, v is the output shading value

S is the light source illumination vector 50 (FIG. 2)

N is the surface normal at the grid point d is the diffuse illumination, a constant r is the reflectivity of the surface at the grid point, where $0 < r < 1$ Other shading functions, which, for example, take into account glossy highlights of shiny surfaces, are known in the art. Glossy highlights are the specular component of the shading, whereas $(\underline{S} \, \underline{N} + d)r$ is the diffuse component.

For color images, the calculation can be repeated for each individual color component. Repeating the calculation for each component ultimately leads to three sets of regions of constant shading, which are then clipped with respect to each other to define fine new regions of constant shading each of which is characterized by a single color.

A particularly advantageous method of this invention is used for color shading. The method provides color shading with a single parameter. The parameter v which usually represents the shade of gray or brightness of a single color component is instead used to control a blend between the model color and one of two predetermined colors. If the blend factor is less than a predetermined value, the blend is made between the object color and black, representing the case where diffuse illumination dominates. If the blend factor is greater than the predetermined value, specular illumination is dominant and the blend is made between the object color and a light color. If the light color for the specular illumination blend is white, the effect achieved is similar to rendering highlights for an object made of plastic. In addition to producing a useful graphics representation, the blend factor is a single parameter, thereby reducing the computations and saving memory over what would be required for three color components.

Still referring to FIG. 1, the array of shading values is supplied at input 24 to the application of a contouring function in step 26. A preferred contouring function is that of A. Preusser, "Computing area filling contours for surfaces defined by piecewise polynomials," *Computer Aided Geometric Design*, 3 (1986) pp. 267–279, which is herein incorporated by reference. The application of the contouring function provides mathematically described curves of constant shading in the parametric space as output 28. For the cylinder 52 (FIG. 2), regions of constant shading (FIG. 3(c)) are rectangles 80, 82, 84, 86, 88, 90 and 92.

The silhouette curve at output 32 and the shading contour curves at output 28 are combined in clipping step 34. The contour curves are clipped to the consistent-facing region to eliminate data which is out of view because it corresponds to model surfaces that cannot be seen from the selected viewpoint. For the cylinder example, the forward facing region 94 (FIG. 3(d)) clips the regions of constant shading 80, 82, 84, 86, 88, 90, and 92 (FIG. 3(c)) to yield the consistent-facing regions of constant shading, shown in FIG. 3(e), 82a, 84, 86, 88 and 90a. Regions 82 and 90 (FIG. 3(c)) were clipped to smaller regions of constant shading 82a and 90a, respectively, (FIG. 3(e)) and regions 80 and 92 (FIG. 3(c)) were eliminated entirely (because they correspond to the out-of-view part of the cylinder).

The consistent-facing regions of constant shading are output at 33 from step 34 to the mapping step 35. Mapping step 35 maps the regions of constant shading at 33 from parameter space back to the original three-dimensional model. The mapping is accomplished by first transforming points along the boundary of the clipped regions of constant shading in parameter space to points in the three-dimensional space of the model in step 35. The three-dimensional clipped regions of constant shading at output 36 are passed to the occlusion step 38.

Occlusion is the process of determining which portions of the surfaces of a model, or more generally of a set of models comprising a scene, are visible from the prescribed viewpoint and which surfaces are hidden. A preferred method for occlusion is a modification of that described by M. E. Newell, et al., "A Solution to the Hidden Surface Problem," *Proceedings of the ACM National Conference* 1972, pp 443–450, which is herein incorporated by reference. Briefly, the method searches systematically for points within regions of overlap among surfaces. In the unmodified algorithm, the search uses the edge boundaries of polygonal surfaces. The modification is to use curved boundaries of bicubic patch meshes.

The occlusion process need not be completely automated. If not completely automated, the user may specify the occlusion order manually. For example, cases of interpenetrating surfaces, i.e., surfaces which intersect, with portions of each occluding the other, and cases of cyclic overlap, in which a set of objects are interleaved in a way such that putting them in a strict order of occlusion is not possible, may be left to the user to resolve manually. Alternatively, the occlusion process may be completely automated.

The output 40 of the occlusion step 38 is a set of clipped regions of constant shading, modified to exclude the hidden surfaces. Then, in step 42, the points from the three-dimensional model space are mapped to two-dimensional display space by perspective or non-perspective projection. A curve is fit to the points in display space to define the region. For clarity of the illustrations in FIG. 3, only a few regions of constant shading are shown so that the shading does not look continuous across the surface. In practice, many additional shades may be used to achieve the appearance of continuous shading.

Again referring to FIG. 1, the output 44 of the mapping in step 42 is a resolution-independent representation of the three-dimensional model projected into two-dimensions. The mathematically defined curves that represent the regions of constant shading are output in a format consistent with two-dimensional illustration software, such as Adobe Illustrator. The regions can therein be combined with other two-dimensional illustration elements and also edited as desired.

The clipped regions of constant shading are filled in step 46 to yield the final rendering of the model, The process of filling a mathematically described region is well known in the art. As part of the filling process, a mathematical function or look-up table is used to convert constant color regions specified by a single parameter blend factor into the four color components (cyan, magenta, yellow, and black) used for color printing. A preferred approach is to output the description in the PostScript™ page description language which is compatible with existing laser printers and typography equipment that produce high resolution output.

The method is readily adapted to render textures or separately defined two-dimensional graphics art on the surfaces of models. Two-dimensional graphics art might, for example, include a label designed for a bottle, which is subsequently applied to the modeled surface of the bottle for rendering as a combined three-dimensional image.

A user may apply a two-dimensional graphics image to the surface of a three-dimensional model by first placing the two-dimensional graphics art in a two-dimensional parametric space representation of the model. When the combined image is rendered, the shading contours computed for the geometry of the three-dimensional model are applied to the colors of the graphics artwork. The outlines defined in the artwork are used to clip the colors of the artwork to their correct locations in parametric space. For example, if a letter A is colored red, a set of shading contours for the red color would first be generated and then clipped to the outline defining the letter A. When rendered, the letter would appear on the model contours in correct perspective and in red.

The method as described may advantageously be implemented in computer software. If the fill step 46 is performed by a PostScript™ compatible printing device, particularly a typography device, the fill may advantageously be performed with hardware elements.

It should be understood that the foregoing description is only illustrative of a preferred embodiment of the invention. As will be understood by those skilled in the art, many changes in the methods described above may be made by the skilled practitioner without departing from the spirit and scope of the invention, which should be limited only as set forth in the claims that follow.

We claim:

1. A computer implemented method of displaying a three-dimensional model having one or more surfaces, the method comprising computer controlled steps of:

providing the three-dimensional model in a computer readable medium of a computer system;

projecting a parametric surface representation of the three-dimensional model into two-dimensional parametric space;

selecting surface regions of predetermined shading in the two-dimensional parametric space by;
  a. mapping an array of grid points onto the two-dimensional parametric space;
  b. forming an array of shading values by applying a shading function at each grid point; and
  c. applying a contouring function to the array of shading values to select the surface regions of predetermined shading;

determining the boundaries of consistent-facing regions boundaries of the consistent-facing regions by applying a silhouette function to the parametric surface representation of the three-dimensional model;

clipping the regions of predetermined shading by the boundaries of the consistent-facing regions to derive consistent-facing regions having the predetermined shading;

mapping the derived consistent-facing regions to display space; and displaying the mapped consistent-facing regions.

2. The method of claim 1 wherein the predetermined shading is constant shading.

3. The method of claim 1 wherein the three-dimensional model is composed of one or more bicubic patch meshes.

4. The method of claim 1 wherein the selecting of the surface regions of predetermined shading and the determining of the boundaries of the consistent-facing regions are performed concurrently.

5. The method of claim 1 wherein the predetermined shading is determined by applying a shading function to the parametric surface representation of the three-dimensional model.

6. The method of claim 1 wherein the surface regions are selected by applying a shading function to the parametric surface representation of the three-dimensional model.

7. The method of claim 6 wherein the shading function is:

$$v=(\underline{S}\ \underline{N}+d)r$$

where v is an output shading value;

S is a light source illumination vector;

N is a surface normal at said grid point;

d is a diffuse illumination constant; and r is reflectivity of a surface of said three-dimensional model at said grid point.

8. The method of claim 1 wherein said three-dimensional model has a color, the method further comprising:

specifying a first illumination color;

specifying a second illumination color;

specifying a threshold value;

computing a blend factor corresponding to a fractional weight between said three-dimensional model color and the first illumination color if said blend factor is less than or equal to the threshold value, and the blend factor corresponds to a fractional weight between the three-dimensional model color and the second illumination color if the blend factor is greater than the threshold value.

9. A method for rendering a two-dimensional image to appear to conform to a surface of a three-dimensional model wherein the two-dimensional image is defined by curves in a two-dimensional coordinate system, comprising:

representing the three-dimensional model in two-dimensional parametric space;

establishing a correspondence between the two-dimensional coordinate system and the two-dimensional parametric space representation of the three-dimensional model;

computing shading contours for the two-dimensional image based upon its three-dimensional surface geometry by selecting of the surface regions of predetermined shading in two-dimensional parametric space including:
  a. mapping an array of grid points onto the two-dimensional parametric space;
  b. forming an array of shading values by applying a shading function at each grid point; and
  c. applying a contouring function to the array of shading values to select the surface regions of predetermined shading;

clipping the shading contours to determine regions of constant shading by applying a silhouette function to the parametric surface representation of the three-dimensional model;

mapping the regions of constant shading to a display space; and displaying the image.

10. The method of claim 9 wherein the regions of constant shading in display space are filled before they are displayed.

11. The method of claim 9 wherein said three-dimensional model has a color, said method further comprising:

specifying a first illumination color;

specifying a second illumination color;

specifying a threshold value;

computing a blend factor corresponding to a fractional weight between said three-dimensional model color and said first illumination color if said blend factor is less than or equal to said threshold value, and said blend factor corresponds to a fractional weight between the three-dimensional model color and said second illumination color if the blend factor is greater than said threshold value.

* * * * *